United States Patent [19]

Mehr-Ayin et al.

[11] Patent Number: 5,004,084

[45] Date of Patent: Apr. 2, 1991

[54] CLOSED LOOP CONTROL OF A HYDRAULICALLY CONTROLLED CLUTCH

[75] Inventors: Kourosh Mehr-Ayin, Vista; Paul A. Schuh, San Diego, both of Calif.

[73] Assignee: Sundstrand Corporation, Rockford, Ill.

[21] Appl. No.: 356,273

[22] Filed: May 24, 1989

[51] Int. Cl.$^5$ ............................................. F16D 43/284
[52] U.S. Cl. ............................. 192/0.033; 192/0.076; 192/103 F
[58] Field of Search ............... 192/0.033, 0.076, 0.096, 192/52, 103 F, 109 F

[56] References Cited

U.S. PATENT DOCUMENTS

| | | |
|---|---|---|
| 2,995,957 | 8/1961 | Wilson et al. |
| 3,437,188 | 4/1969 | Long ................................. 192/103 |
| 3,822,770 | 7/1974 | Golan ............................. 192/103 F |
| 4,116,321 | 9/1978 | Miller ............................ 192/103 F |
| 4,349,094 | 9/1982 | Pavesi ........................... 192/109 F |
| 4,485,443 | 11/1984 | Knodler ........................ 192/0.033 |
| 4,560,047 | 12/1985 | McCarthy et al. .................. 192/52 |
| 4,615,425 | 10/1986 | Kobayashi et al. ............. 192/0.096 |
| 4,620,624 | 11/1986 | Mitsui et al. ................... 192/0.076 |
| 4,685,062 | 8/1987 | Uriuhara et al. ............... 192/0.076 |
| 4,711,329 | 12/1987 | Hasegawa et al. ................ 192/3.57 |
| 4,729,461 | 3/1988 | Nishikawa et al. ............... 192/3.31 |
| 4,747,082 | 5/1988 | Minato et al. ..................... 365/222 |

FOREIGN PATENT DOCUMENTS 0164420  9/1984  Japan .................... 192/0.033

*Primary Examiner*—Rodney H. Bonck
*Assistant Examiner*—Andrea Pitts
*Attorney, Agent, or Firm*—Antonelli, Terry, Stout & Kraus

[57] ABSTRACT

A control system (100) for a hydraulically controlled clutch (18) for coupling a source of rotary power (12) to a load (102) for accelerating the load from a first velocity to a second velocity within a time measured from a beginning of the acceleration and ending between first and second times measured from the beginning of acceleration with the load being variable during acceleration of the load from the first velocity to the second velocity in accordance with the invention includes a source of pressurized hydraulic fluid (38), a servo valve (42), having an inlet coupled to the source of pressurized fluid and an outlet coupled to the hydraulically controlled clutch, the servo valve being responsive to a control signal to vary the pressure of hydraulic fluid applied to the hydraulically controlled clutch to vary the coupling between the source of rotary power and an output shaft (22) which is coupled to the load, a speed sensor (112) for producing a speed signal proportional to the speed of the output shaft; a stored program (108) controlling a programmed acceleration of the load from the first velocity to the second velocity within a time interval measured from the beginning of the acceleration and ending between the first and second times; a controller (110), responsive to the stored program and the speed signal, for producing the control signal which is a function of a difference (E) between the velocity signal and a velocity controlled by the stored program.

37 Claims, 4 Drawing Sheets

CLOSED LOOP CONTROL OF A HYDRAULICALLY CONTROLLED CLUTCH

DESCRIPTION

1. Technical Field

The present invention relates to hydraulically controlled clutches for coupling a source of rotary power to a load for accelerating the load from a first velocity to a second velocity within specified time limits measured from the beginning of the acceleration. More particularly, the present invention relates to hydraulically controlled clutches of the aforementioned type for use in auxiliary power units (APU) in airframes.

2. Background Art

FIG. 1 illustrates a block diagram of an APU 10 which was manufactured by the Assignee of the present invention. The APU 10 functioned to selectively couple output power from a turbine and gear reduction transmission 12 to a turbine propulsion engine 14 for purposes of starting the turbine propulsion engine. Coupling of rotary power from the output 16 of the turbine and gear reduction transmission 12 is through hydraulically controlled clutch 18, which is controlled by an open loop control which specifies the acceleration of the turbine propulsion engine 14 in accordance with a velocity program 20. The output of the clutch 22 is applied to torque converter 24, which acts as a torque amplifier and reduces the magnitude and variation of load torque imposed on the clutch and functions to provide a limited degree of slippage to avoid high inertial shock caused by rapid engagement of the hydraulic clutch 18. The output 26 of the torque converter 24 is applied to gear box 28 having an output 30 which drives the turbine propulsion engine 14 at a velocity reduced from the velocity applied to the input 26.

The oil supply circuit for the hydraulic clutch 18 is described as follows. Oil supply 32 supplied oil to pump 34 which provided pressurized oil on output 36 which is applied to relief valve 38 which regulates the output pressure of the pump 34 by feeding back oil to the inlet when the output pressure exceeds the rated pressure of the relief valve at which the feedback opens. The output 40 of the relief valve 38 is applied to servo valve 42 which opens under the velocity program 20 to control the pressure of oil applied to the hydraulically controlled clutch 18 on output 44. Variation of the oil pressure on output 44 controls the rate of slip between the output 16 of the turbine and gear reduction transmission 12 and the output 22 of the clutch 18. When maximum oil pressure is applied to the hydraulically controlled clutch 18 on output 44, the output 16 of the turbine and gear reduction transmission 12 is locked to the output 22. As stated above, the torque converter 24 was necessary to reduce inertial shocks caused by the engagement of the plates 45 of the clutch 18. As a consequence of the velocity program 20 being an open loop control, non-linearities in the engagement of the plates of the hydraulic clutch 18 as a function of the hydraulic pressure applied on output 44 cause the clutch to have a non-linear engagement characteristic as a function of the applied hydraulic pressure. The limited slip provided by the torque converter 24 cushions the application of torque impulses to the gear box 28 which could lead to damaging of the teeth therein where there is a rapid change of torque as a consequence of a change in the magnitude of the velocity program during engagement of the hydraulic clutch 18.

The torque load which the turbine propulsion engine 14 represents to the output 30 of the gearbox 28 is relatively linear as a function of acceleration of the rotor of the turbine from a stop condition to the speed at which it is to be driven for purposes of starting.

In applications where the gearbox 28 is also driving at least one of a hydraulic pump and a generator a non-linear torque load is present during the acceleration of the rotor of the turbine propulsion engine 14 as a consequence of the energy drawn by a hydraulic pump being a non-linear function of its rotational velocity and further the load represented by a generator varying as a function of the electrical load being driven by the generator. Accordingly, the APU 10 of FIG. 1 functions satisfactorily for the purpose of starting the turbine propulsion engine 14 as a consequence of the torque converter 24 removing torque transients, and the relative torque represented by the rotor of the turbine propulsion engine 14 for purposes of starting being substantially less than if the gearbox 28 were also driving at least one of a hydraulic pump and a generator.

U.S. Pat. No. 2,995,957 discloses a transmission control which utilizes a control loop to control pressure applied to a torque transmitter to maintain a predetermined engine speed profile during shifting of the transmission.

U.S. Pat. No. 3,437,188 discloses a pneumatic control for varying the coupling of a constant speed motor to a variable speed output. The desired output speed is set by a speed set potentiometer. A control loop maintains the variable output speed in accordance with the speed set by the potentiometer.

U.S. Pat. No. 3,822,770 discloses a system for regulating a hydraulically actuated clutch in a drive train by regulating the pressure of fluid applied to the clutch. Hydraulic feedback is utilized in the system.

DISCLOSURE OF INVENTION

The present invention is a control system for a hydraulically controlled clutch for coupling a source of rotary power to a load for accelerating the load from a first velocity to a second velocity within a time measured from a beginning of the acceleration and ending between first and second times measured from the beginning of the acceleration with the load being variable during the acceleration of the load from the first velocity to the second velocity. A preferred embodiment of the present invention is in an APU in which a hydraulically controlled clutch selectively couples a turbine and gear reduction transmission having an output rotating at high velocity, which may be variable in velocity, to an output of the clutch for driving a load which varies during the acceleration of the load from the first velocity to the second velocity with a closed loop velocity control being utilized to maintain the acceleration in accordance with a stored program for controlling a programmed acceleration of the load from the first velocity to the second velocity. In a preferred embodiment, the output of the clutch is coupled to a gearbox which drives at least one of a hydraulic pump and generator which represent a variable torque during the acceleration of the load from the first velocity to the second velocity as a consequence of a non-linear response of a hydraulic pump to a variable shaft input velocity and the electrical generator representing a load varying as a function of velocity. The hydraulic pump and/or generator may be used for starting of a turbine propulsion engine. A closed loop velocity control including a proportional and differential controller which is responsive to an error signal generated by the comparison of the actual shaft velocity of the output from the clutch and the desired velocity specified by the stored program generates a control signal for a servo valve which regulates the pressure of oil applied to the hydraulic clutch to precisely control the engagement of the clutch to cause the velocity of the output of the clutch to follow the stored program. Alternatively, a closed loop velocity control including a proportional, integral and differential controller, responsive to an error signal generated by the comparison of the actual shaft velocity of the output from the clutch and the velocity determined by integration of a stored acceleration, generates the control signal for the servo valve. The dynamic response characteristic of the hydraulic clutch as driven by a proportional and differential or a proportional and integral control provides fast closed loop response which enables the pressure of the oil applied to the hydraulic clutch to be modulated rapidly to counter any non-linearities in the velocity of the output of the clutch as a consequence of a variable load being driven and a non-linear friction response of the hydraulic clutch as a function of the velocity of the output of the clutch.

A control system for a hydraulically controlled clutch for coupling a source of rotary power to a load for accelerating the load from a first velocity to a second velocity within a time measured from a beginning of the acceleration and ending between first and second times measured from the beginning of the acceleration with the load being variable during the acceleration of the load from the first velocity to the second velocity in accordance with the invention includes a source of pressurized hydraulic fluid; a servo valve, having an inlet coupled to the source of pressurized fluid and an outlet coupled to the hydraulically controlled clutch, the servo valve being responsive to a control signal to vary the pressure of hydraulic fluid applied to the hydraulically controlled clutch to vary the coupling between the source of rotary power and an output shaft which is coupled to the load; a sensor for producing a velocity signal proportional to the speed of the output shaft; a stored program controlling a programmed acceleration of the load from the first velocity to the second velocity within a time interval measured from the beginning of the acceleration and ending between the first and second time limits; a controller, responsive to the stored program and the velocity signal for producing the control signal which is a function of a difference between the velocity signal and a desired velocity of the output shaft during acceleration from the first velocity to the second velocity produced by the stored program. The controller is a proportional and differential controller and the control signal is proportional to and a differential of the difference between the velocity signal and the desired velocity controlled by the program. Alternatively, the stored program may be a set acceleration for accelerating the load from the first value to the second value and the controller is a proportional integral and differential controller with the control signal being proportional to and differential of the difference between the velocity signal and an integral of the set acceleration. The stored program may be a series of velocity values which are read out synchronously during accelerating of the load from the first velocity to the second velocity. The load may comprise a gearbox driving at least one first load which is variable during the acceleration between the first and second velocities. The first load may be a hydraulic pump or a generator. Additionally, the gearbox may drive at least a first load and a second load which are variable during acceleration between the first and second velocities with the first load being a hydraulic pump and the second load being a generator. Finally, the source of rotary power may be variable in velocity.

BEST MODE FOR CARRYING OUT THE INVENTION

Figure 1:
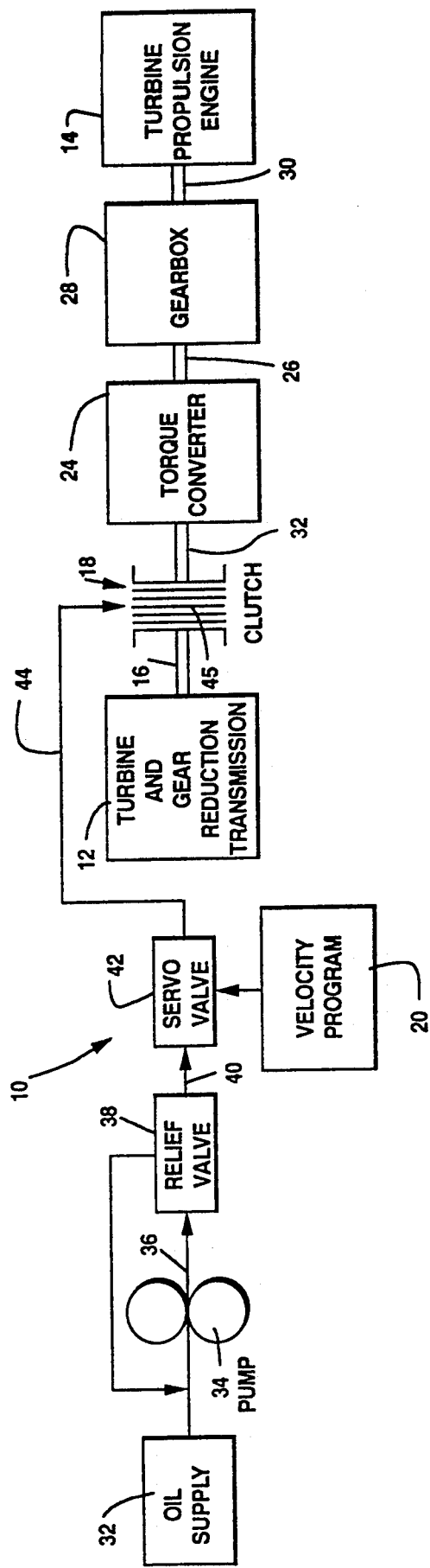
FIG. 1 illustrates a block diagram of a prior art APU manufactured by the assignee of the present invention.
Figure 2:
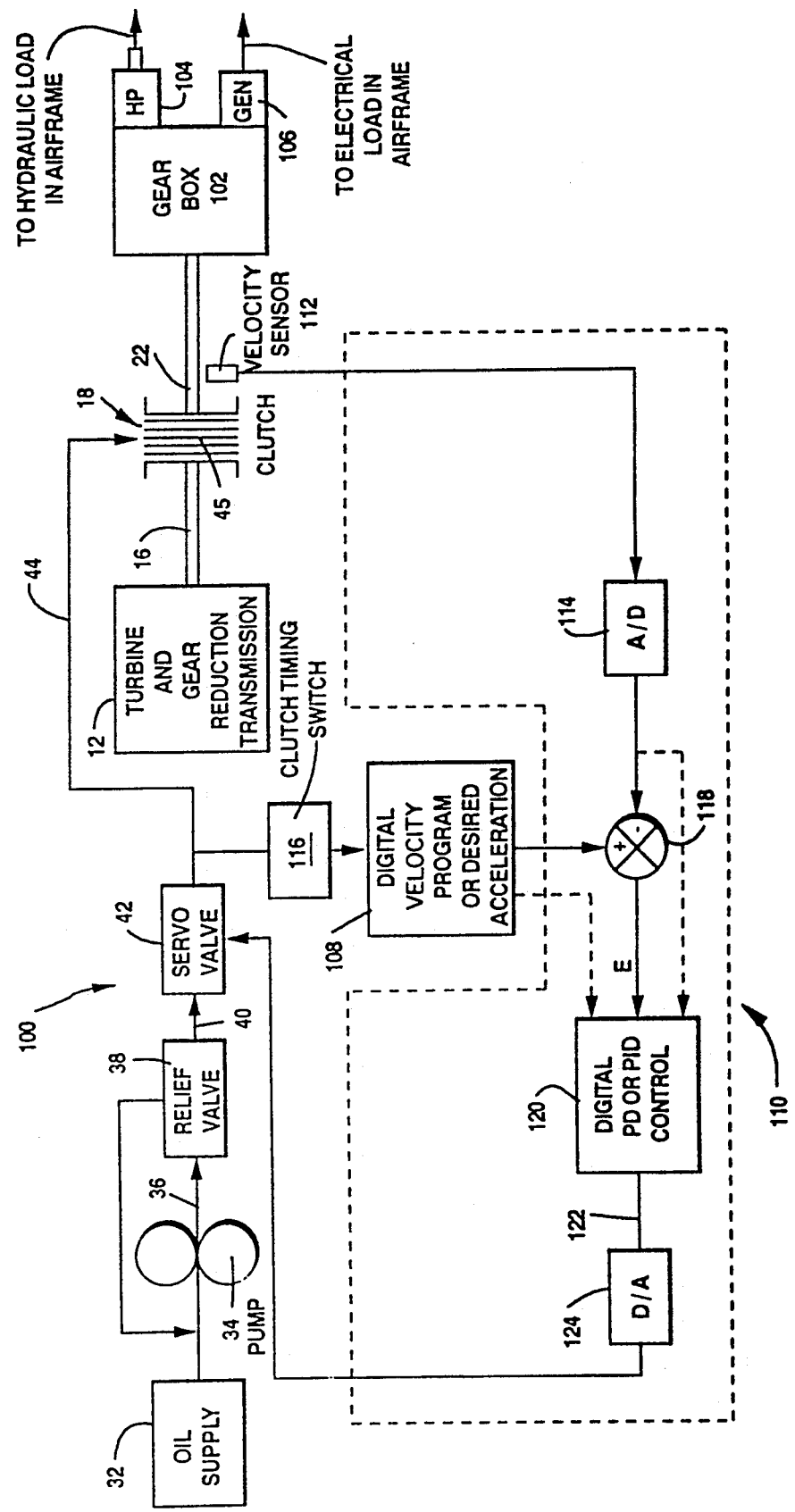
FIG. 2 illustrates a block diagram of an APU in accordance with the present invention.
Figure 3A:
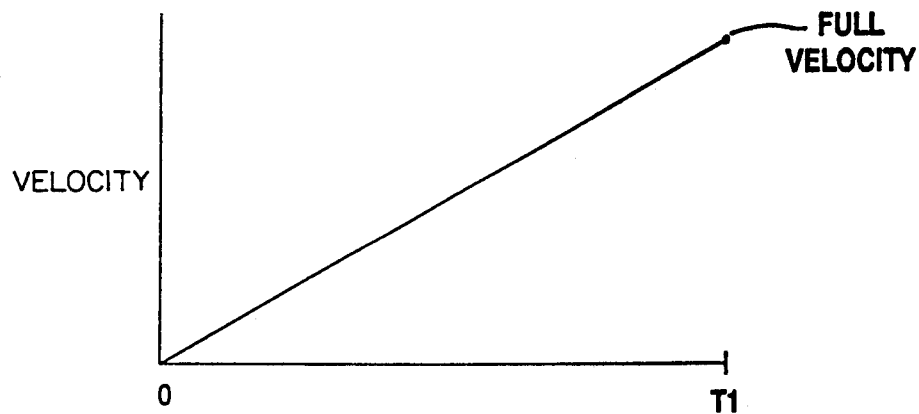
FIGS. 3A-C illustrate, respectively, speed, friction and load torque in the APU as a function of time during the acceleration of the load from the first velocity to the second velocity.
Figure 3B:
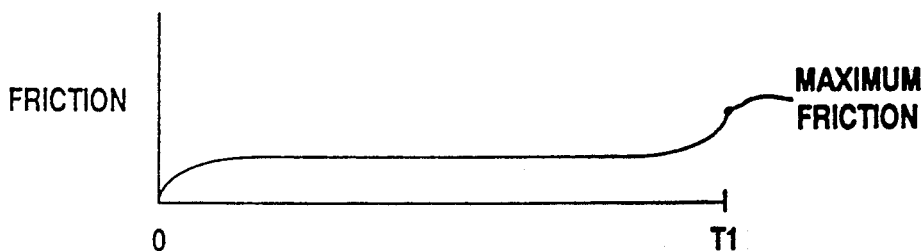
Figure 3C:
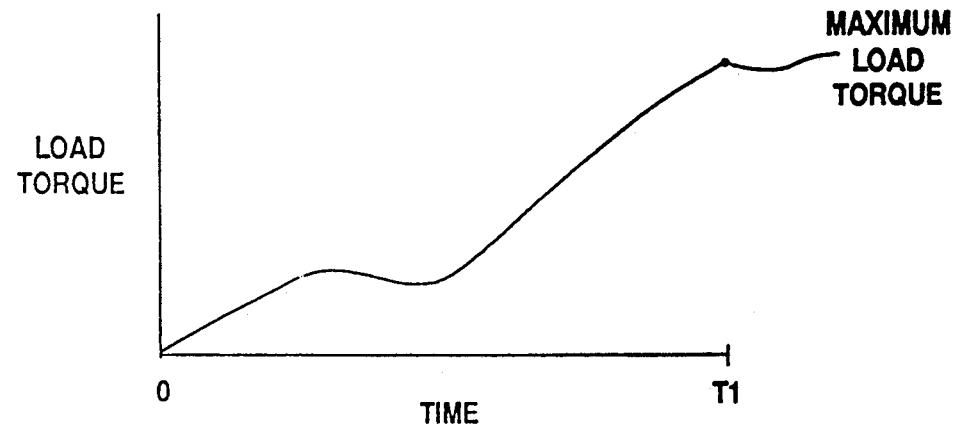

FIG. 2 illustrates a block diagram of an APU 100 in accordance with the present invention. Like reference numerals identify like parts in FIGS. 1 and 2 and will not be described herein in conjunction with FIG. 2 except to the extent necessary to understand the present invention. The APU 100 of FIG. 2 has a performance specification which is much more stringent than that of the APU 10 of FIG. 1. In a commercial implementation of the APU 100 of FIG. 2, acceleration of the output 22 of the clutch 18 from stop to full velocity is to occur between 1.8 seconds and 2.2 seconds. If acceleration of the output 22 occurs for an interval longer than 2.5 seconds, tests have shown that the life of the plates 45 in the hydraulically actuated clutch 18 is drastically limited in comparison when the acceleration of the output is made from stop to full velocity in no greater than 2.5 seconds. Additionally, acceleration of the output 22 to full velocity in less than 1.8 seconds is not permitted to avoid damaging the gearbox 102 as a consequence of loading the input with a torque higher than the rated torque of the teeth of the gear drive therein. Finally, the gearbox 102 is driving a load which is several times greater than the load of the turbine propulsion engine 22 of the system of FIG. 1 as a consequence of the presence of the torque converter 24. The load is at least one of a hydraulic pump 104 and an electrical generator 106. The hydraulic pump 104 has a characteristic such that the load torque required to drive it as a function of velocity from stop to full velocity is non-linear. The generator 106 has a characteristic caused by oil viscous drag in a cooling mechanism within the generator which varies as a function of velocity during the acceleration of the generator from stop to full velocity. As a consequence of at least the hydraulic pump 104 representing a non-linear load to the gearbox 102 during acceleration from stop to full velocity, the load torque represented by the input of the gearbox which is driven by the output 22 of the clutch varies during the acceleration substantially from zero to full velocity. FIG. 3C illustrates a possible variation of the load torque represented by the gearbox 102 to the output 22 of the hydraulic clutch 18 with it being understood that other non-linear loads would be provided by the gearbox 102 depending upon individual characteristics of the hydraulic pump 104 and generator 106 chosen and additionally whether output power from either or both of the hydraulic pump and generator was being drawn during the acceleration of the gearbox from stop to full velocity. Additionally, the coefficient of friction of the clutch varies dynamically during the acceleration of the output 22 from stop to full velocity as illustrated in FIG. 3B. The desired velocity control program 108 as illustrated in FIG. 3A varies linearly as a function of time between zero and full velocity over a time interval equal to T1. It should be understood that in the preferred embodiment of the present invention the time elapsed between zero and T1 is midway between the lower time limit of 1.8 seconds and the upper time limit of 2.2 seconds.

As a consequence of the non-linearities described above which are present during the acceleration of the gearbox 102 from zero to full velocity, substantial variation in actual acceleration from the desired linear acceleration of FIG. 3A would occur without the velocity control loop provided by controller 110 as described below. A velocity sensor 112 produces a signal which is proportional to the velocity of the output 22 of hydraulic clutch 18. The velocity signal produced by the velocity sensor 112 is converted from analog to digital by A to D converter 114. A clutch timing switch 116 produces an output signal at time 0 of the velocity program illustrated in FIG. 3A. The signal produced by the clutch timing switch 116 synchronizes the digital velocity program 108 which may be in the form of a constant acceleration or a series of velocity values which are read out synchronously during the accelerating of the gearbox 102 from stop to full velocity in accordance with the velocity program of FIG. 3A. Summer 118 produces an error signal proportional to the difference of the actual velocity signal produced by the velocity sensor 112 and the desired velocity at the time of comparison. The error signal is applied to a digital proportional and differential control 120 of conventional design. Alternatively, a set acceleration may be applied to a PID control 120 from the program 108 which integrates the acceleration to produce the desired velocity program. The PID control 120 produces an error signal equivalent to that produced by summer 118 and proportionately and differentially amplifies the error signal of the servo control signal 122. The dotted lines indicate connections when the aforementioned set acceleration and PID control is utilized. Digital control 120 provides a servo-control signal 122 which is proportional to the error signal and a differential thereof to provide the necessary high frequency response to modulate the pressure applied on control line 44 to the hydraulically controlled clutch 18 to cause the velocity of the output 22 of the hydraulic clutch to follow the desired velocity program of FIG. 3A. The servo-control signal is converted from digital to analog by digital to analog converter 124 prior to application to servo valve 42. It should be understood that the desired velocity program of FIG. 3A of accelerating the gearbox 102 which drives non-linear loads represented by the hydraulic pump 104 and the generator 106 during the acceleration from stop to full velocity could not be achieved without the combination of the closed loop control and hydraulic servo system. Otherwise, the various perturbations in the system would cause the actual acceleration of the gearbox 102 to vary outside of the lower and upper limits described above.

Figure 4:
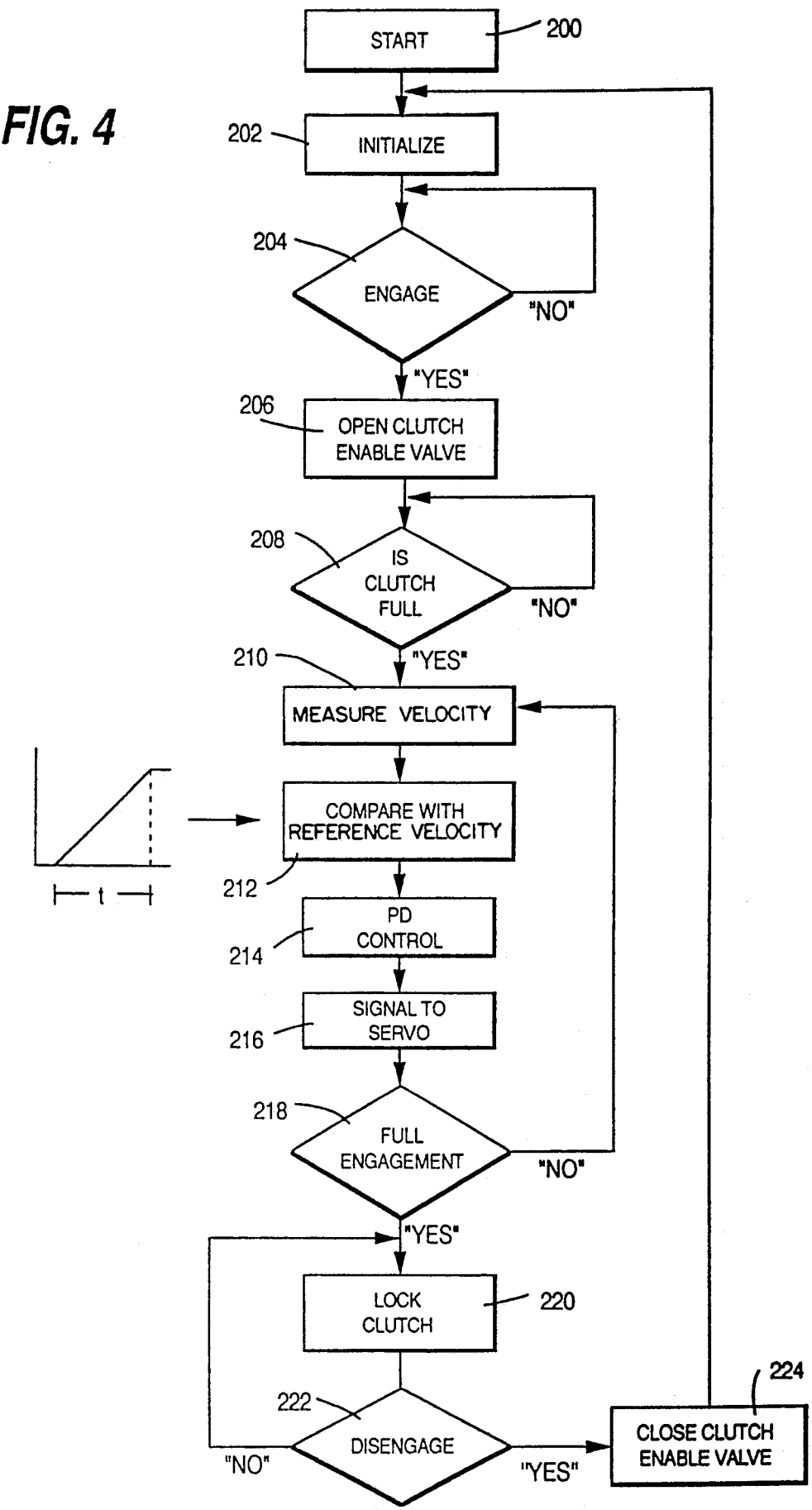
FIG. 4 illustrates a flowchart of the operation of the APU of FIG. 2.

FIG. 4 illustrates a flowchart of the operation of the clutch control of the present invention. Operation proceeds from starting point 200 to initialization of the system at point 202. At point 204 a determination is made if the clutch is to be engaged. If the answer is "yes" at point 204, servo valve 42 is opened at point 206. At decision point 208 a determination is made if the hydraulic system of the clutch 18 is full of fluid. At point 208 when the answer is "yes" the clutch timing switch 116 starts the acceleration cycle during which velocity sensor 112 is interrogated at point 210 by controller 110 At point 212 the error E is determined. At point 214, the PD or PID control 120 amplifies the error signal E to generate the servo control signal 122. The servo control signal 122 is applied to servo valve 42 at point 216. At decision point 218 a determination is made if the final velocity of FIG. 3A is reached. If the answer is "no", the operation loops back to point 210. If the answer is "yes" at decision point 218, the program proceeds to point 220 where the clutch 18 is fully engaged. At point 222 a decision is made whether to disengage the clutch. If the answer is "no" at point 222 the operation loops back to point 220. If the answer is "yes" at point 222, operation proceeds to point 224 where the servo valve is shut off and operation loops back to point 202. It should be understood that other operational sequences are within the scope of the invention.

While the preferred embodiment of the present invention is an APU utilized in an airframe, it should be understood that other implementations of the invention are possible where it is necessary to drive a non-linear load between first and second velocities with a velocity program having characteristics which do not permit substantial variation from the desired velocity program.

While the invention has been described in terms of its preferred embodiment, it should be understood that numerous modifications may be made thereto without departing from the spirit and scope of the invention as defined in the appended claims. It is intended that all such modifications fall within the scope of the appended claims.

We claim:

1. A control system for a hydraulically controlled clutch for coupling a source of rotary power to a load for accelerating the load from a first velocity to a second velocity within a time measured from a beginning of the acceleration and ending between first and second times measured from the beginning of acceleration with the load being variable during the acceleration of the load from the first velocity to the second velocity comprising:
   a source of pressurized hydraulic fluid;
   a servo valve, having an inlet coupled to the source of pressurized fluid and an outlet coupled to the hydraulically controlled clutch, the servo valve being responsive to a control signal to vary the pressure of hydraulic fluid applied to the hydraulically controlled clutch to vary the coupling between the source of rotary power and an output shaft which is coupled to the load;
   a sensor for producing a velocity signal proportional to the velocity of the output shaft;
   a stored program controlling a programmed acceleration of the load from the first velocity to the second velocity within a time interval measured from the beginning of the acceleration and ending between the first and second times; and a controller, responsive to the stored program and the velocity signal, for producing the control signal which is a function of a difference between the velocity signal and a desired velocity of the output shaft during acceleration from the first velocity to the second velocity produced by the stored program.

2. A control system in accordance with claim 1 wherein:
the controller is a proportional and differential controller and the control signal is proportional to and a differential of a difference between the velocity signal and the desired velocity controlled by the program.

3. A control system in accordance with claim 1 wherein:
the controller is a proportional, integral and differential controller and the control signal is proportional to a difference between the velocity signal and the desired velocity determined by the controller by integrating a set acceleration specified by the stored program; and
the stored program is a single value of acceleration for accelerating the load from the first velocity to the second velocity.

4. A control system in accordance with claim 2 wherein:
the stored program is a series of velocity values which are read out synchronously during the accelerating of the load from the first velocity to the second velocity.

5. A control system in accordance with claim 1 wherein the load comprises:
a gearbox driving at least a first load which is variable during the acceleration between the first and second velocities.

6. A control system in accordance with claim 5 wherein the first load comprises:
a hydraulic pump.

7. A control system in accordance with claim 5 wherein the first load comprises:
a generator.

8. A control system in accordance with claim 1 wherein the load comprises:
a gearbox driving at least a first load and a second load which are variable during the acceleration between the first and second velocities.

9. A control system in accordance with claim 8 wherein:
the first load is a hydraulic pump; and
the second load is a generator.

10. A control system in accordance with claim 2 wherein the load comprises:
a gearbox driving at least a first load which is variable during the acceleration between the first and second velocities.

11. A control system in accordance with claim 10 wherein the first load comprises:
a hydraulic pump.

12. A control system in accordance with claim 10 wherein the first load comprises:
a generator.

13. A control system in accordance with claim 2 wherein the load comprises:
a gearbox driving at least a first load and a second load which are variable during the acceleration between the first and second velocities.

14. A control system in accordance with claim 13 wherein:
the first load is a hydraulic pump; and
the second load is a generator.

15. A control system in accordance with claim 3 wherein the load comprises:
a gearbox driving at least a first load which is variable during the acceleration between the first and second velocities.

16. A control system in accordance with claim 15 wherein the first load comprises:
a hydraulic pump.

17. A control system in accordance with claim 15 wherein the first load comprises:
a generator.

18. A control system in accordance with claim 3 wherein the load comprises:
a gearbox driving at least a first load and a second load which are variable during the acceleration between the first and second velocities.

19. A control system in accordance with claim 18 wherein:
the first load is a hydraulic pump; and
the second load is a generator.

20. A control system in accordance with claim 4 wherein the load comprises:
a gearbox driving at least a first load which is variable during the acceleration between the first and second velocities.

21. A control system in accordance with claim 20 wherein the first load comprises:
a hydraulic pump.

22. A control system in accordance with claim 20 wherein the first load comprises:
a generator.

23. A control system in accordance with claim 4 wherein the load comprises:
a gearbox driving at least a first load and a second load which are variable during the acceleration between the first and second velocities.

24. A control system in accordance with claim 23 wherein:
the first load is a hydraulic pump; and
the second load is a generator.

25. A control system in accordance with claim 1 wherein:
the source of rotary power is variable in velocity.

26. A control system in accordance with claim 2 wherein:
the source of rotary power is variable in velocity.

27. A control system in accordance with claim 3 wherein:
the source of rotary power is variable in velocity.

28. A control system in accordance with claim 4 wherein:
the source of rotary power is variable in velocity.

29. A control system in accordance with claim 5 wherein:
the source of rotary power is variable in velocity.

30. A control system in accordance with claim 6 wherein:
the source of rotary power is variable in velocity.

31. A control system in accordance with claim 7 wherein:
the source of rotary power is variable in velocity.

32. A control system in accordance with claim 8 wherein:
the source of rotary power is variable in velocity.

33. A control system in accordance with claim 9 wherein:

the source of rotary power is variable in velocity.

34. A control system for a hydraulically controlled clutch for coupling a source of rotary power to a load disposed in an airframe for accelerating the load from a first velocity to a second velocity within a time measured from a beginning of the acceleration and ending between first and second times measured from the beginning of acceleration with the load being variable during the acceleration of the load from the first velocity to the second velocity comprising:

a source of pressurized hydraulic fluid;

a servo valve, having an inlet coupled to the source of pressurized fluid and an outlet coupled to the hydraulically controlled clutch, the servo valve being responsive to a control signal to vary the pressure of hydraulic fluid applied to the hydraulically controlled clutch to vary the coupling between the source of rotary power and an output shaft which is coupled to the load;

a sensor for producing a velocity signal proportional to the velocity of the output shaft;

a stored program storing data which specifies a programmed acceleration of the load from the first velocity to the second velocity within a time interval measured from the beginning of the acceleration and ending between the first and second times; and a controller, responsive to the stored program and the velocity signal, for producing the control signal which is a function of a difference between the velocity signal and a desired velocity of the output shaft during acceleration from the first velocity to the second velocity produced by the stored program.

35. A control system in accordance with claim 34 wherein:

the load is an APU.

36. A control system in accordance with claim 35 wherein:

the APU comprises a gearbox which drives at least one of a hydraulic pump and a generator.

37. A control system in accordance with claim 34 wherein:

a time between the beginning of acceleration and the first time and a time between the beginning of acceleration and the second time are fixed.

* * * * *